Oct. 25, 1938.   J. BILLIG ET AL   2,134,678
LIQUID TANK
Filed May 4, 1935   2 Sheets-Sheet 2
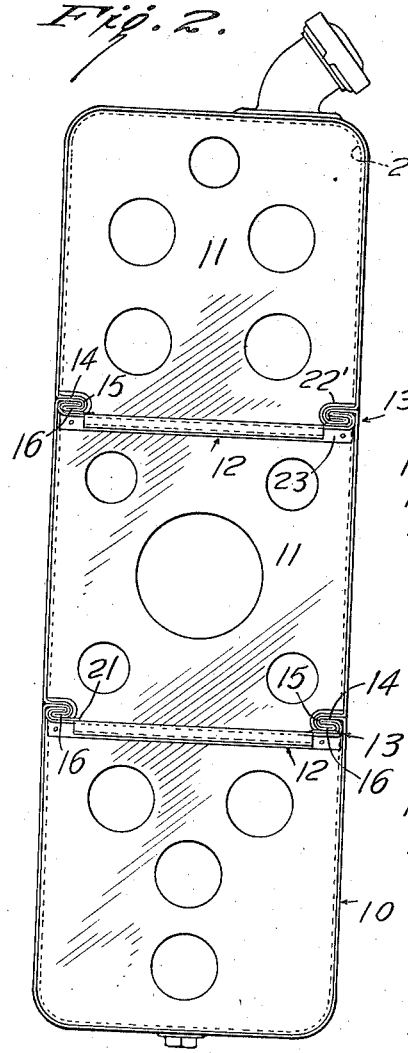
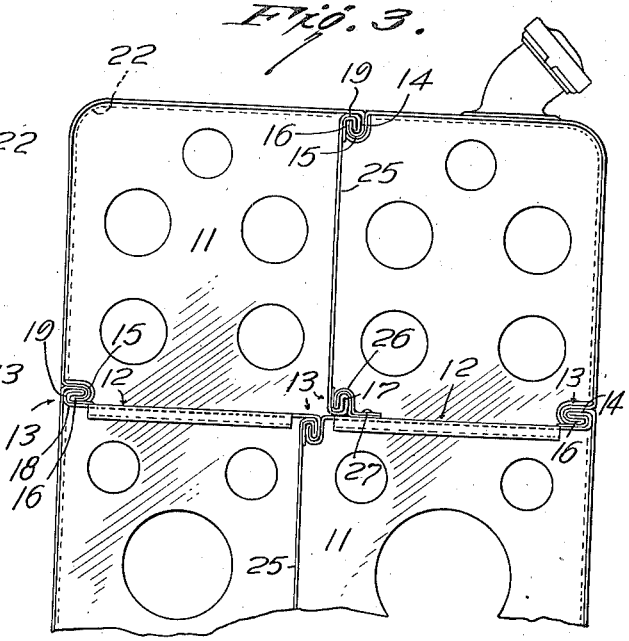
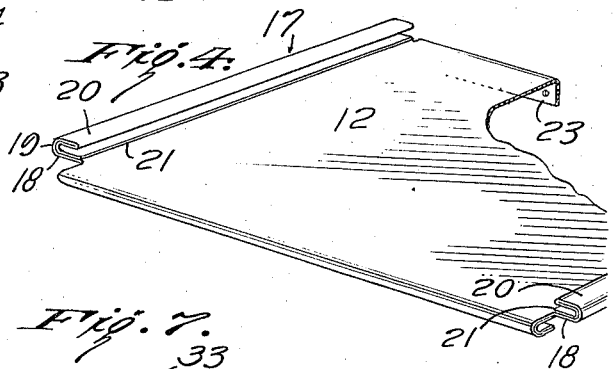
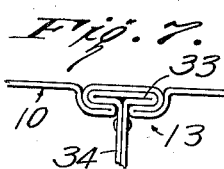
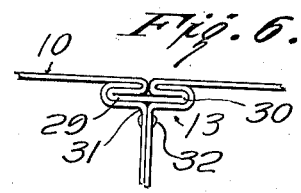
INVENTORS
JACOB BILLIG,
BY PHILIP J. BILLIG,
ATTORNEY.

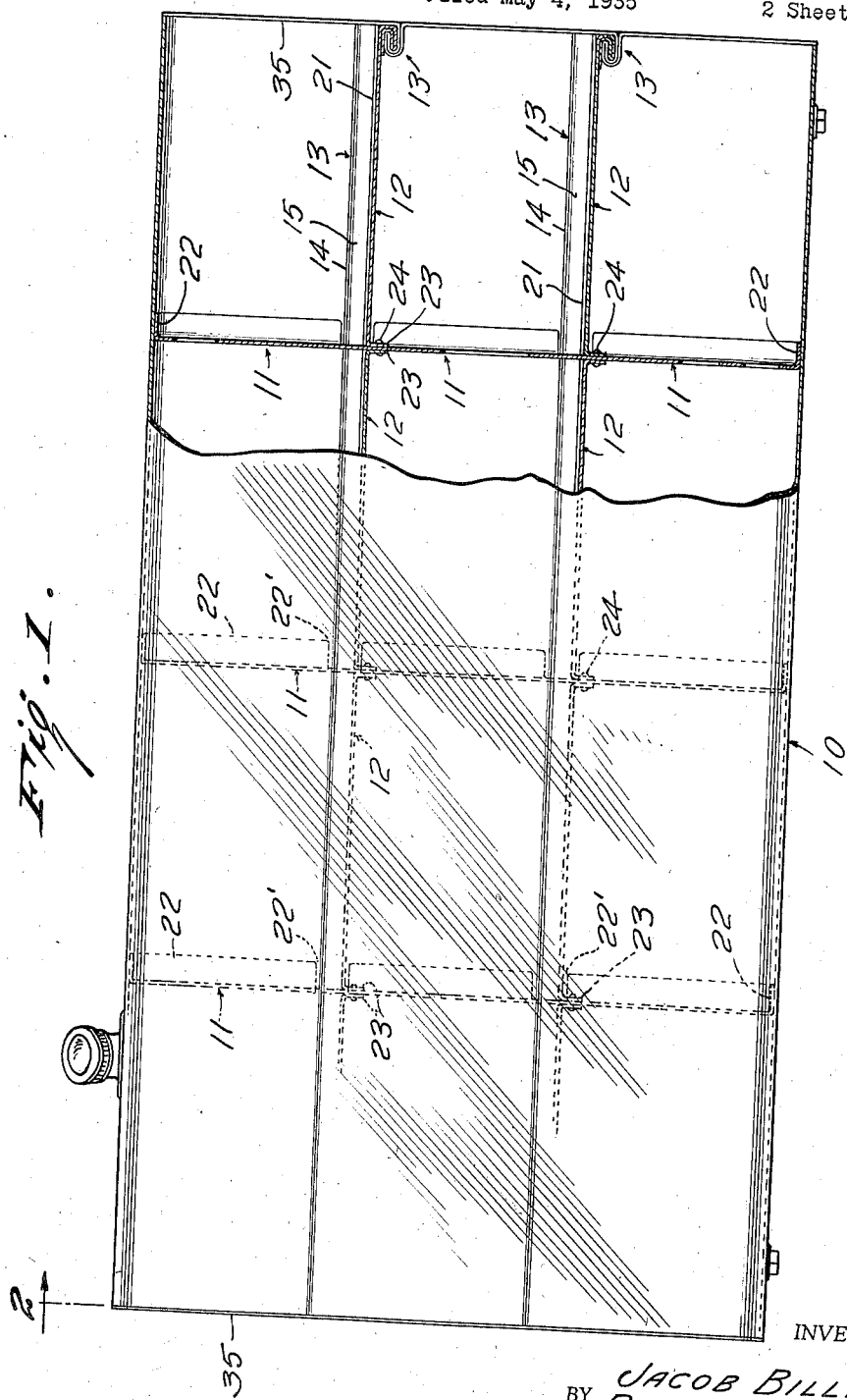

Patented Oct. 25, 1938

2,134,678

UNITED STATES PATENT OFFICE 2,134,678

LIQUID TANK

Jacob Billig and Philip J. Billig, Bronx, N. Y., assignors to Breeze Corporation, Inc., Newark, N. J., a corporation Application May 4, 1935, Serial No. 19,844

1 Claim. (Cl. 220—22)

The present invention relates to fuel tanks in general and particularly to fuel tanks for aeroplanes.

Aeroplane fuel tanks are subjected to high frequency vibrations usually for long periods at a time, as, for instance, numerous shocks and jars, as when taking off and landing the aeroplane. Fuel tanks must withstand severe internal and external pressure without failure or leakage, as, for example, during a steep glide or dive. This, of course, is accelerated by the sudden impact arising from the changing angles or positions of the aeroplane.

It will, therefore, be readily appreciated that aeroplane tanks of the usual construction, owing to the fact that they are formed of a great number of separate sections or units, secured by riveting, when subjected to the above mentioned strains, very frequently become loosened at their seams, resulting in fuel leakage, and very disastrous results.

Obviously, when a fuel tank of this type is constructed in a number of sections, these sections must necessarily be individually ribbed or braced, necessitating a structure of considerable weight, to say nothing of the structural weakness at the joints of riveting.

To overcome the above and other disadvantages incidental to fuel tanks of this particular type, our invention consists in the design and novel arrangement of a shell, formed preferably of a unitary thickness of sheet metal, and provided with longitudinally extending crimped portions or tracks which extend the entire length of the shell or casing and are oppositely disposed and inwardly extended for the purpose of forming parallel tracks. Each of these tracks is backwardly bent upon itself to form a hook in cross-section; by reason of the fact that they extend the entire length of the tank, the tracks provide an extremely efficient bracing means for the shell or casing of the fuel tank. These longitudinal tracks also provide interlocking means for firmly supporting and securing horizontally disposed plates in the tank against accidental displacement after they have been sealed into the fuel tank at assembly. These horizontal plates are likewise provided with backwardly bent portions for snugly mating with and fitting the longitudinal tracks, thereby giving added rigidity and support for effectually bracing the fuel tank, for instance, against internal and external strains.

Vertically disposed baffle walls in the tank are each provided with an angularly bent rim or flange and adapted snugly to fit the interior of the shell not only for firmly supporting the fuel tank to retain it in its proper position but for materially reenforcing it completely around the periphery thereof.

By providing the partition plates with angularly bent flanges, we may economically rivet each adjacent pair to its contiguous baffle wall. The opposite ends of these partition plates or those aligning with the outer or open ends of the fuel tank are provided with backwardly bent and reenforced channels or tracks for permitting the sliding of the ends into their proper position, thereby rendering the fuel tank in condition for the final welding of the end walls to the edges of the casing.

It will, therefore, be readily understood that a fuel tank is formed in which a minimum number of different sections are employed, these sections being assembled without the aid of special tools, without necessity for any previous skill or training, and in a minimum amount of time.

The present invention is directed primarily to the novel construction of a fuel tank as disclosed, and is not concerned with the accessories or the operation thereof.

It is an important advantage of the present invention that it is simply and economically constructed and maintained without the necessity of repairs or replacement, owing primarily to its rigid and braced construction and to the elimination of any riveting to the shell or casing thereof.

Other objects of this invention will hereinafter be set forth, or will be apparent from the description and the drawings, in which is illustrated an exemplification of the invention as applied for different purposes.

The invention, however, is not intended to be restricted to any particular construction or arrangement of parts, or to any particular application thereof, or to any specific manner of use, or to any of various details, shown or described, as the same may be modified in various particulars, or be applied in many varied relations, without departing from the spirit and scope of the claimed invention, the exemplification herein being merely to show actual means by which the invention might be effectuated.

On the drawings, in which the same reference characters refer to the same parts throughout, and in which is disclosed such exemplification:

Figure 1 is a view in side elevation, partially broken away and shown in section, of a fuel tank constructed in accordance with our invention;

Figure 2 is an end view of the tank shown in Figure 1, with that end plate indicated by the arrow and the numeral 2 in Figure 1 removed;

Figure 3 is a similar view of a portion of a fuel tank, illustrating another embodiment of our invention;

Figure 4 is a view in perspective of one of the partition plates, and

Figures 5, 6, and 7 are fragmentary detail views, showing modified means for forming the longitudinally extending crimped portions.

This invention, in the forms or embodiments shown in the drawings and briefly described, comprises a casing or wrapper 10, a plurality of vertically disposed baffle walls or plates 11, horizontally extending partition plates 12, and combined interlocking and reenforcement means 13.

Referring particularly to Figures 1, 2, and 4, there is disclosed an elongated fuel tank substantially rectangular in cross-section, although it is to be understood that fuel tanks of this nature may be formed of a great number of various shapes or designs. In this instance, however, the fuel tank is substantially rectangular in cross-section, and each of the side walls have formed therein two longitudinally extending crimped portions which extend from one extreme end of the casing or wrapper 10 to the other end thereof. Each of these crimped portions or combined interlocking and reenforcement means is preferably integrally formed from the casing by a horizontally extending neck portion 14, which is curved or bent, as at 15, to provide a backwardly bent portion 16 extending to a point relatively close to the respective side wall from which it has been formed. These crimped portions, it will be noted, are substantially U-shaped in cross-section and are adapted for sliding and interlocking engagement with the substantially similarly formed U-shaped side edges 17 of horizontal partition plates 12.

In order to present the maximum amount of rigidity to these beaded or U-shaped edges 17, the crimped portion is formed of two layers, that is to say, the metal of the partition is extended in an outward direction, as indicated at 18, then is rounded, as at 19, and then is provided with an inwardly bent portion 20. The sheet metal is now backwardly bent upon itself to conform to the contour of the outer layer or thickness, terminating at free edge 21. This construction is clearly illustrated in Figure 4 of the drawings. Excellent results have been obtained by forming the outer and inner sections of these interlocking U-shaped members to fit snugly with respect to each other so that there will be a minimum amount of play therebetween when in their assembled position.

The vertically extending baffle plates are preferably formed with an angularly bent rim or flange 22 designed to fit snugly adjacent the inner surface of the casing or wrapper 10. This baffle wall is provided with cut-out portions 22' slightly larger than the interlocking means 13 for a reason hereinafter to be understood.

For the purpose of securely mounting the partition plates 12 with respect to the baffle walls 11, the ends of each of the intermediate partition plates 12 may be angularly bent to form transversely extending flanges 23 for the purpose of riveting. In this manner, the rivets 24 pass through and connect the vertical baffle wall 11 and a pair of the flanges 23 as is clearly illustrated in Figure 1 of the accompanying drawings.

It may be stated here that the usual type of filler necks and strainer outlets may be provided in the casing or wrapper, where found convenient.

In the embodiment of our invention illustrated in Figure 3, we have disclosed a fuel tank having a plurality of compartments horizontally disposed, in which instance baffle walls 25 may be arranged in a lengthwise direction. In this instance, the upper and lower edges may be secured by means of the interlocking means already described. It has also been found highly efficient to employ an elongated track member 26 for the purpose of engaging the U-shaped extreme edge 17 of the baffle wall 25. The horizontal portion of this track member 26 may be riveted to the partition plate 12, as indicated at 27.

In the embodiment of the invention shown in Figure 5, the casing 10 is bent in an inward direction, as already described, but, instead of providing a backwardly bent portion, it is merely bent at a substantially right angle. In this instance, the partition plate 12 is extended to the inner surface of the casing 10 and backwardly bent at this point to conform to the angular shape just described and to terminate with a free edge 28.

Figure 6 illustrates a substantially T-shaped construction for the interlocking means 13, in which instance a pair of oppositely disposed, elongated portions 29 and 30 are formed from the sheet metal of the casing or wrapper 10. The partition plate or wall would be of double thickness up to the point of contact with the portions 29 and 30 where they would be bent as shown at 31 for the purpose of snugly fitting the T-shaped member. Rivets 32 may be employed for securely fastening the pair of plates comprising the partition plate.

In Figure 7 we have disclosed a somewhat similar form of the invention wherein one of the interlocking members is provided with a T-shaped head 33, and the female portion of the interlocking means is formed from the casing or wrapper 10. In this instance, also, the plates 34 may be securely held together by means of rivets, spot welding or the like.

Having described the construction of the several details of our invention, the operation thereof will now be readily understood. For the purpose of preventing the marring or scatching of the interior of the fuel tank, it has been found highly desirable to assemble it in sections, that is to say, one of the baffle walls is initially slid into its proper position within the casing or wrapper 10, and then a pair of partition plates are properly located and riveted. These steps are, of course, repeated until the interior has been completely assembled. The end plates 35 are now slid in a sidewise direction upon their horizontal co-acting locking means or crimped portion 13 until they are in proper alignment and completely enclose the walls of the casing or wrapper 10. The fuel tank is now ready for the welding operation which is, of course, accomplished in the usual manner.

It will now be readily appreciated that a fuel tank of this construction, although containing no external rivets, will be extremely rigid, absolutely safe in operation, and require the minimum amount of care and attention.

What we claim is:

A tank comprising a metallic shell having a plurality of horizontally arranged re-inforcing and holding elements crimped in its walls by bending the metal inwardly, rounding the crimp and bending the same back on itself to leave hooks formed of a double layer of metal, horizontally arranged metal partitions disposed in the shell and provided with hooked edges formed by bending the metal to conform to the said hooks and to leave two layers of metal disposed in engagement with the said hooks and a closure at each end of the shell.

JACOB BILLIG.
PHILIP J. BILLIG.